United States Patent [19]

Okamoto et al.

[11] Patent Number: 4,891,539
[45] Date of Patent: Jan. 2, 1990

[54] BRUSH DEVICE

[75] Inventors: Kyoichi Okamoto; Hiroyuki Morikane; Shigeru Shiroyama, all of Hyogo, Japan

[73] Assignee: Mitsubishi Denki K.K., Tokyo, Japan

[21] Appl. No.: 115,730

[22] Filed: Nov. 2, 1987

[30] Foreign Application Priority Data

Oct. 31, 1986 [JP] Japan ............................. 61-168428
Nov. 4, 1986 [JP] Japan ............................. 61-169318

[51] Int. Cl.$^4$ ........................................ H02K 13/00
[52] U.S. Cl. .................................... 310/239; 310/45; 310/64
[58] Field of Search ............ 310/239, 238, 240, 241, 310/242, 245, 247, 248, 249, 227, 89, 43, 45, 64, 65

[56] References Cited

U.S. PATENT DOCUMENTS 4,355,253 10/1982 Vollbrecht ........................ 310/239
4,593,221 6/1986 Harris ............................... 310/239
4,673,836 6/1987 Akiyama ........................... 310/239

FOREIGN PATENT DOCUMENTS 0253312 7/1963 Australia .......................... 310/227
0866529 2/1953 Fed. Rep. of Germany ...... 310/227
0023774 2/1980 Japan ............................... 310/239
0181156 12/1985 Japan ....................... 310/239 UX
0361498 3/1973 U.S.S.R. ........................... 310/239
2075276 11/1981 United Kingdom ............... 310/242

Primary Examiner—R. Skudy
Attorney, Agent, or Firm—Sughrue, Mion, Zinn, Macpeak & Seas

[57] ABSTRACT

A brush device in a rotary electric machine such as a starter motor. Brush accommodating arrangement of the brush device for accommodating brushes and brush springs are provided with a plurality of through-holes to radiate heat therethrough efficiently. The brush device is simple in construction and high in heat resistance.

6 Claims, 2 Drawing Sheets

BRUSH DEVICE

BACKGROUND OF THE INVENTION (1) Field of the Invention

This invention relates to a brush device in a rotary electric machine such as a starter motor.

(2) Description of the Prior Art

FIGS. 1 and 2 show a conventional brush device which has been disclosed, for instance, in Published Unexamined Japanese Utility Model Application No. 181156/1985. In these figures, reference numeral 1 designates a commutator of a rotary machine; 6a, a bolt for fixing the stator of the machine to its frame; 2a and 2b, positive brushes and negative brushes, respectively; 3, brush springs; and 4, a brush holding frame which accommodates the four brushes 2a and 2b and the four brush springs 3. The positive side of the frame 4 is fixedly secured through an electrically insulating synthetic resin board 5 to an iron substrate 6 so that the frame 4 is electrically insulated from the substrate, while the negative side is fixedly connected directly to the substrate 6 by caulking. The positive brushes 2a have external lead wires 7a and 7b, respectively, which are connected to an external input lead wire 8, while the negative brushes 2b are connected through external lead wires 9 to the substrate 6. Lead wires 7a, 7b and 9 pass through side portions of the brush holding frame 4 at corresponding points, such as the points 17a, 17b and 19 illustrated in FIGS. 1 and 2.

The brush springs 3 urge the brushes 2a and 2b against the commutator 1. Further in FIG. 1, reference numeral 10 designates a connector connected to the external lead-wire 8. The connector 8a is connected to a power source such as a battery (not shown).

In the above-described brush device, the brushes 2a and 2b are placed in the space or chamber 18 formed by the brush holding frame 4 and the synthetic resin boards 5 or the substrate 6. Since the frame's radially outward ends 18a are closed (as illustrated in FIG. 1), since the radially inward ends are effectively air-sealed by the brushes' contact with commutator 1, and since the points or openings 17a, 17b and 19 are effectively air-sealed by the lead wires passing therethrough, the heat generated by the brushes is not radiated outside, thus deforming the synthetic resin boards (or thermally deforming the brush holding frame).

SUMMARY OF THE INVENTION

An object of the present invention is to eliminate the above-described difficulty accompanying a conventional brush device for a rotary electric machine.

More specifically, an object of the invention is to provide a brush device excellent in heat radiation merely by forming through-holes therein.

The foregoing object and other objects of the present invention have been achieved by the provision of a brush device in which through-holes are formed in the brush accommodating spaces or chambers, respectively, for improvement of the heat resistance of the brush device.

DESCRIPTION OF THE PREFERRED EMBODIMENTS

Figure 1:
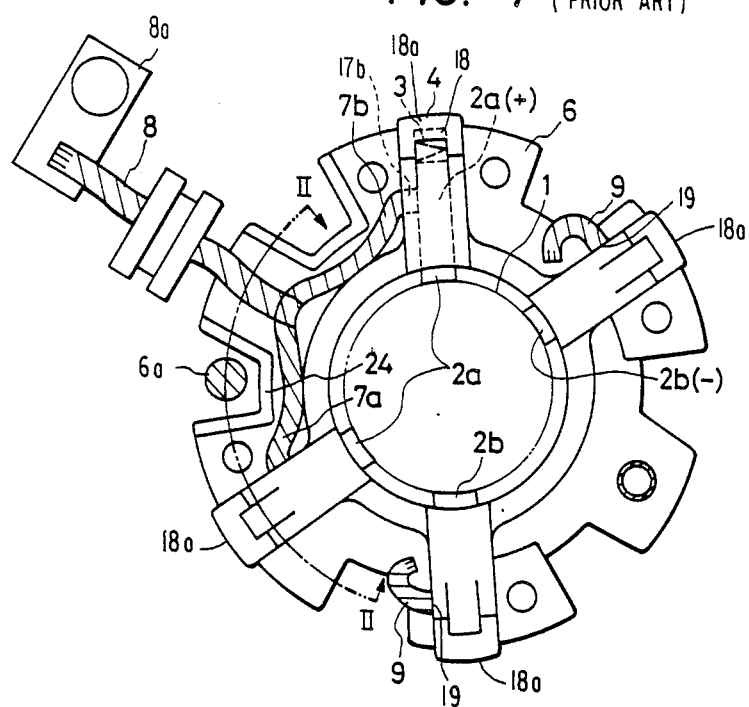
FIGS. 1 and 2 are a front view and a sectional view (taken along line II—II of FIG. 1), respectively, showing essential components of a conventional brush device.
Figure 2:
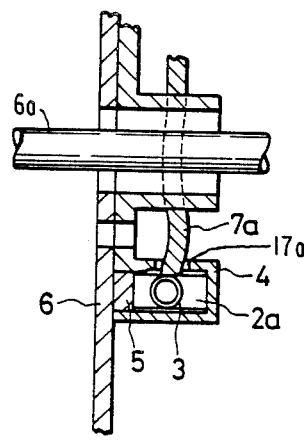
Figure 3:
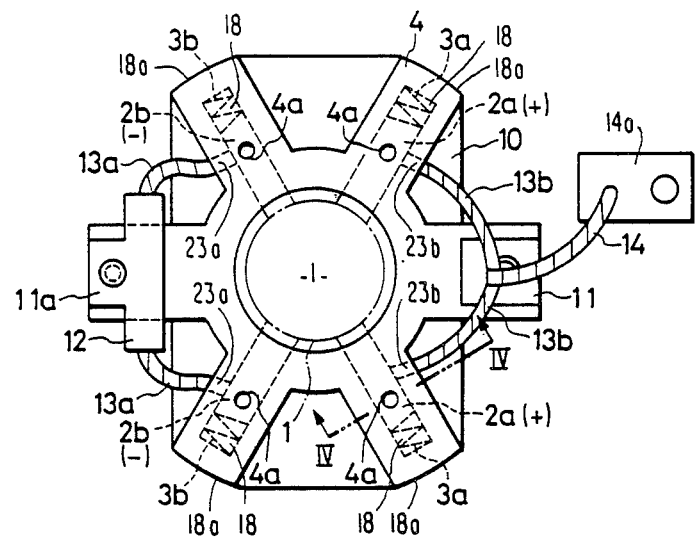
FIGS. 3 and 4 are a front view and a sectional view (taken along line IV—IV of FIG. 3), respectively, showing essential components of a first embodiment of a brush device for a rotary electric machine according to the present invention.
Figure 4:
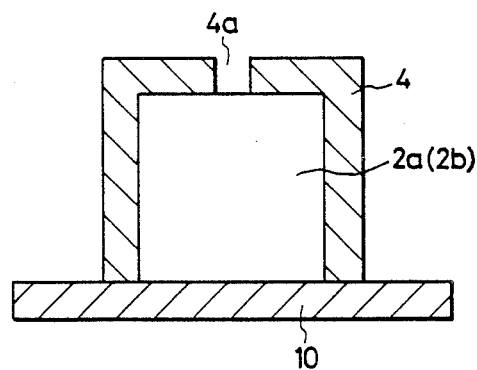

FIGS. 3 and 4 are a plan view and an enlarged sectional view showing essential components of a first embodiment of a brush device according to the present invention. The same reference numerals found in FIGS. 1 and 2 are used to designate corresponding parts in FIGS. 3, 4 and 5.

In FIGS. 3 and 4, reference characters 3a and 3b designate brush springs adapted to urge the above-described brushes 2a and 2b against a commutator 1; 4, a brush holding frame of thermoplastic synthetic resin for accommodating the brushes 2a and 2b and the brush springs 3a and 3b; and 4a, through-holes formed in the brush holding frame 4.

Further in FIGS. 3 and 4, reference numeral 10 designates an insulating board of resin which insulates the brushes 2a and 2b from an end bracket or substrate (not shown); 11, a female-threaded mounting piece of iron which is threadably engaged with the end bracket; and 12, protrusions extended from a portion 11a of the mounting piece 11. The protrusions 12 are welded to lead wires 13a, respectively. Thus, the negative brushes 2b are electrically connected to the end bracket through the external lead wires 13a, the protrusions 12 and the mounting piece 11. The positive brushes 2a are electrically connected to a power source such as a battery (not shown) through lead wires 13b, a lead-out wire 14 and a connector 14a. As with the prior art device of FIGS. 1 and 2, the lead wires 13a and 13b pass through side portions of the brush holding frame 4 at corresponding points, such as 23a and 23b.

As described above, in the brush device, the through-holes 4a are formed in the brush slide-contact parts of the brush holding frame 4, respectively, so that the brushes 2a and 2b whose temperatures are raised can contact the external air through the through-holes. Therefore, with the aid of the convection of air caused by the rotation of the rotary machine, the heat of the brushes 2a and 2b is efficiently radiated or removed from the chambers or spaces 18 which are otherwise effectively air-sealed as described above relative to the conventional brush device illustrated in FIGS. 1 and 2. As a result, the temperature rise of the brushes 2a and 2b is suppressed, and the brush holding frame is maintained at low temperature. Thus, the brush device of the present invention, unlike the conventional brush device of FIGS. 1 and 2, is free from deformation of the synthetic resin boards and thermal deformation of the brush holding frame.

In the above-described brush device, the through-holes 4a formed in the brush holding frame 4 are circular; however, they may be elliptic, triangular, rectangular, and so forth. Furthermore, two or more through-holes may be formed in each of the brush slide-contact parts of the brush holding frame.

In the above-described brush device, the through-holes are formed in the brush holding frame 4. However, these through-holes may be formed in the insulating board 10 forming the brush accommodating chambers in correspondence to the brush slide-contact parts as shown in FIG. 5.

Figure 5:
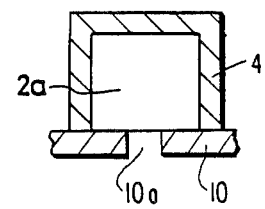
FIG. 5 is a sectional view showing essential components of a second embodiment of the brush device according to the present invention.

Also in the brush device of FIG. 5, the brushes 2a and 2b contact the external air through the through-holes 10a. Therefore, with the aid of the convection of air caused by the rotation of the rotary machine, the heat of the brushes is efficiently radiated or removed. As a result, the temperature rise of the brushes 2a and 2b is suppressed, and the insulating board 10 is maintained at low temperature. Thus, the same effect as that of the first embodiment can be obtained with the brush device of FIG. 5.

In the above-described brush device of FIG. 5, the through-holes 10a formed in the insulating board 10 are circular; however, modifications are possible without departing from the scope of the present invention. For instance, the through-holes 10a may be elliptic, triangular, or rectangular. In addition, a plurality of through-holes 10a may be formed in the insulating board 10 in correspondence to the brush slide contact parts.

As is apparent from the above description, according to the present invention, a brush device excellent in heat radiation can be obtained merely by forming the through-holes in the brush accommodating chambers, for instance in the brush slide-contact parts of the brush holding frames or in the insulating board covering the axial opening of the brush holding frames.

What is claimed is:

1. A brush device for a rotary electric machine having a rotation axis and including brush accommodating means containing both brushes, first end portions of which are brought into slide-contact with a rotatable commutator of said rotary electric machine, and also brush springs adapted to urge said brushes against said commutator; said brushes being electrically connected to respective external lead wires passing at points through elongated side portions of said brush accommodating means; said brush accommodating means comprising:

a plurality of hollow elongated brush holding means for accommodating said brushes and brush springs, each of said brush holding means containing one of said elongated side portions and having an elongated side opening extending perpendicular to said rotation axis and in the longitudinal direction of an elongated side portion of said each brush holding means; and an insulating board which covers said elongated side opening in each of said brush holding means in such a manner that said brushes are electrically insulated from a substrate on which said brush device is adapted to be mounted;

said brush accommodating means being provided, in said elongated side portions thereof, with a plurality of air through-holes located adjacent respective ones of said points through which said lead wires pass, said through-holes extending in a direction parallel to said rotation axis and functioning to permit external air to contact, and remove heat from, said brushes with the air of the convection of air caused by rotation of said rotary electric machine; and each of said hollow brush holding means being substantially air-sealed except for its respective through-hole.

2. A brush device as claimed in claim 1, wherein said through-holes are formed through respective longitudinal sides of said plurality of hollow elongated brush holding means in correspondence to brush slide-contact parts, said longitudinal sides being spaced from the elongated side openings in a direction parallel to said rotation axis.

3. A brush device as claimed in claim 1, wherein said through-holes are formed through said insulating board in portions thereof covering the elongated side opening of each of said brush holding means in correspondence to brush slide-contact parts.

4. A brush device as claimed in claim 1, wherein said insulating board is made of a synthetic resin which is subject to heat deformation but for the brush-cooling effect provided by said air through-holes.

5. A brush device as claimed in claim 2, wherein said insulating board is made of a synthetic resin which is subject to heat deformation but for the brush-cooling effect provided by said air through-holes.

6. A brush device as claimed in claim 3, wherein said insulating board is made of a synthetic resin which is subject to heat deformation but for the brush-cooling effect provided by said air through-holes.

* * * * *